(12) United States Patent
Gutha et al.

(10) Patent No.: US 9,244,450 B2
(45) Date of Patent: Jan. 26, 2016

(54) APPROACH FOR SWITCHING BETWEEN POINT TYPES WITHOUT AFFECTING CONTROL LOGIC

(75) Inventors: Stalin Gutha, Bangalore (IN); Lavanya Bhadriraju, Bangalore (IN); Ankur Jhawar, Bangalore (IN); Kevin B. Moore, Chaska, MN (US)

(73) Assignee: Honeywell International Inc., Morristown, NJ (US)

( * ) Notice: Subject to any disclaimer, the term of this patent is extended or adjusted under 35 U.S.C. 154(b) by 1192 days.

(21) Appl. No.: 12/650,497

(22) Filed: Dec. 30, 2009

(65) Prior Publication Data

US 2011/0160877 A1 Jun. 30, 2011

(51) Int. Cl.
*G05B 19/042* (2006.01)

(52) U.S. Cl.
CPC .. *G05B 19/0426* (2013.01); *G05B 2219/23258* (2013.01); *G05B 2219/2614* (2013.01)

(58) Field of Classification Search
CPC ............... G05B 19/0426; G05B 2219/23258; G05B 2219/2614
USPC ........................................ 700/42, 275, 276
See application file for complete search history.

(56) References Cited

U.S. PATENT DOCUMENTS

| | | | | |
|---|---|---|---|---|
| 4,292,666 | A * | 9/1981 | Hill et al. | 700/18 |
| 2004/0189717 | A1 * | 9/2004 | Conally et al. | 345/853 |
| 2005/0230490 | A1 | 10/2005 | Pouchak et al. | |
| 2008/0004754 | A1 | 1/2008 | Pouchak et al. | |
| 2008/0010049 | A1 * | 1/2008 | Pouchak et al. | 703/14 |
| 2008/0015739 | A1 | 1/2008 | Wacker | |
| 2008/0016493 | A1 | 1/2008 | Pouchak et al. | |
| 2008/0115153 | A1 | 5/2008 | Brindle | |
| 2008/0125914 | A1 | 5/2008 | Wacker | |
| 2008/0277486 | A1 * | 11/2008 | Seem et al. | 236/49.3 |
| 2009/0077623 | A1 * | 3/2009 | Baum et al. | 726/1 |
| 2009/0113037 | A1 | 4/2009 | Pouchak | |
| 2010/0100583 | A1 | 4/2010 | Pouchak | |
| 2011/0153089 | A1 * | 6/2011 | Tiemann et al. | 700/276 |

OTHER PUBLICATIONS

Structured Computer Organization by Andrew S. Tanenbaum, Prblish by Prentice-Hall dated 1984.*
Honeywell Spyder Bacnet User's Guide, 242 pages, Revised Jul. 2009.
Honeywell Spyder User's Guide 202 pages, Released Jul. 2007.
Siemens, BACnet for DESIGO 27 Pages, prior to Dec. 30, 2009.

* cited by examiner

*Primary Examiner* — Mohammad Ali
*Assistant Examiner* — Ziaul Karim
(74) *Attorney, Agent, or Firm* — Seager, Tufte & Wickhem LLP

(57) ABSTRACT

An approach for switching between point types without affecting control logic. The control logic may have a function block, input and output points connected with links to the function block. A point may be changed from one type to another type of point without affecting its link. A type of point may be modulating, binary, software, constant, or other.

16 Claims, 5 Drawing Sheets

APPROACH FOR SWITCHING BETWEEN POINT TYPES WITHOUT AFFECTING CONTROL LOGIC

RELATED APPLICATIONS

Related co-pending applications include application Ser. No. 12/650,385, filed Dec. 30, 2009, entitled "A Graphical Approach to Setup Data Sharing between Two Controllers"; application Ser. No. 12/650,447, filed Dec. 30, 2009, entitled "A Mechanism for Constructing Generic Control Logic including Versions in Various Protocols"; application Ser. No. 12/650,467, filed Dec. 30, 2009, entitled "Protocol Independent Programming Environment"; application Ser. No. 12/650,476, filed Dec. 30, 2009, entitled "Priority Selection Mechanism for Driving Outputs from Control Logic for Controllers of Various Protocols"; and application Ser. No. 12/650,485, filed Dec. 30, 2009, entitled "An Approach to Automatically Encode Application Enumeration Values to Enable Reuse of Applications across Various Controllers"; and application Ser. No. 12/650,513, filed Dec. 30, 2009, entitled "Changeable BACnet Interface".

Application Ser. No. 12/650,385, filed Dec. 30, 2009, entitled "A Graphical Approach to Setup Data Sharing between Two Controllers", is hereby incorporated by reference. Application Ser. No. 12/650,447, filed Dec. 30, 2009, entitled "A Mechanism for Constructing Generic Control Logic including Versions in Various Protocols", is hereby incorporated by reference. Application Ser. No. 12/650,467, filed Dec. 30, 2009, entitled "Protocol Independent Programming Environment", is hereby incorporated by reference. Application Ser. No. 12/650,476, filed Dec. 30, 2009, entitled "Priority Selection Mechanism for Driving Outputs from Control Logic for Controllers of Various Protocols", is hereby incorporated by reference. Application Ser. No. 12/650,485, filed Dec. 30, 2009, and entitled "An Approach to Automatically Encode Application Enumeration Values to Enable Reuse of Applications across Various Controllers", is hereby incorporated by reference. Application Ser. No. 12/650,513, filed Dec. 30, 2009, entitled "Changeable BACnet Interface", is hereby incorporated by reference.

U.S. patent application Ser. No. 12/256,444, filed Oct. 22, 2008, is hereby incorporated by reference. U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/427,750, filed Jun. 29, 2006, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 10/809,115, filed Mar. 25, 2004, is hereby incorporated by reference.

BACKGROUND

The invention pertains to programming and particularly to various programming environments. More particularly, the invention pertains to heating, ventilation and air conditioning (HVAC) environments.

SUMMARY

The invention is an approach which may abstract point types in a programming tool for control logic to enable switching between point types without affecting the control logic.

DESCRIPTION

Figure 1:
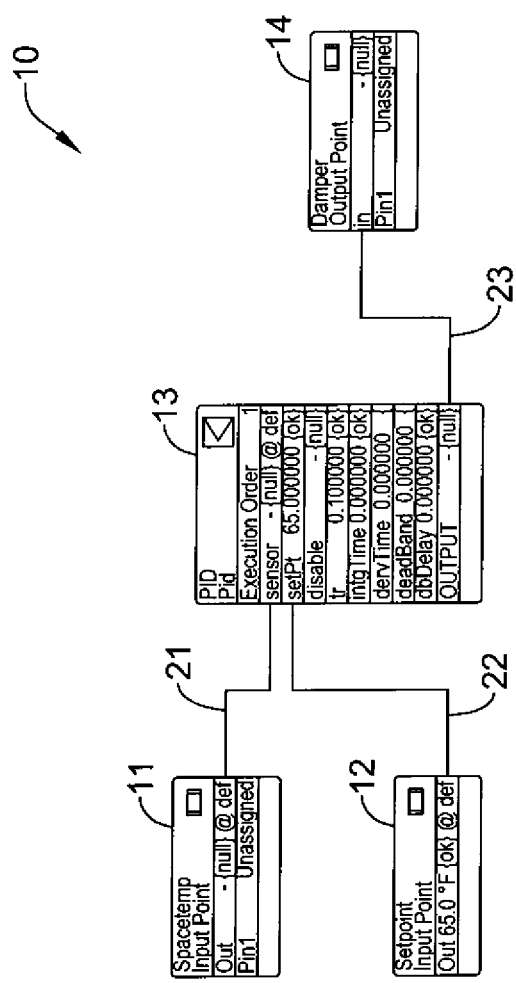
FIG. 1 is a diagram of a simple control logic using a space temperature sensor and set point as inputs to a PID with a damper output.

Heating, ventilation and air conditioning (HVAC) application engineers may create the control programs executable by a processor through defining input points/values, the logic for processing the inputs and finally feeding the results of the logic to output points. When application programmers create such control programs, they often are not necessarily aware whether the inputs and outputs are physically connected to the controllers or whether they are pseudo/virtual points that are to be shared with other controllers.

Typical programming tools may allow different types of points to be created and used with their usage governed by rules. Editing and maintaining complex control logic may become very tedious when the rules are rigid and when much rework needs to be done to switch from one point type to another.

Existing tools in the market may typically allow the point type to be defined at the time of creation and do not necessarily allow changing the type. This may force application programmers to delete points from the control logic, recreate the points and reconnect them in the control logic. Such an approach may take much effort and have a large scope for creating errors.

The Spyder™ (Spyder) BACnet (Bacnet) tool may expose generic entities called "Points". Application programmers may use these "points" and create their control applications without knowing the actual "types" of the points. When an application gets deployed in a particular job, the engineers may choose the "type" of the point to be physical inputs, software inputs, constant values, or other. They may also switch between the different types without having to do any other rework. BACnet is a communications protocol for building automation and control networks.

The Spyder BACnet programming tool may expose two main categories of points—physical and software points. Physical points may represent analog inputs, digital inputs, analog outputs and digital outputs. Software points may represent analog value and binary value objects which are pseudo points.

Programmers may convert a physical input point (AI) to a software input point (AV) without affecting any of the control logic. Similarly, a BACnet binary output may be changed to a binary value object without affecting the logic. This may provide great flexibility for application developers.

The present approach shows how an application developer can create a point and change it without affecting the logic. Creating a point and changing it without affecting the logic may be accomplished in the tool by maintaining high level abstract entities called "points". "Points" may be the objects that are dropped and linked to one or more function blocks or other function blocks if the point is a function block. A "function block" is a module that performs a specific task by reading inputs, operating on them, and outputting one or more values. The points may be referred to "point" objects which in turn may contain child objects that represent the actual type of the point. Whenever the type of point is changed, the child object may be replaced but the parent container "point" object may remain intact, and thus links to one or more function blocks or other function blocks may be retained.

Converting point types may be noted. Generic points may be used for creating control logic and be converted without affecting the logic. First, one may create a simple control logic using a space temp sensor and setpoint as input to a PID (proportional-integral-derivative) controller. The PID output may be connected to a damper output. Then the space temp input may be converted to a constant value, and the damper output may be converted to a BACnet pseudo output (BV object). The approach may demonstrate how the control logic stays intact.

The Figures noted herein may relate to converting point types. The Figures illustrate how generic points may be used for creating control logic 10 and how points can be converted without affecting the logic. FIG. 1 relates to creating generic control applications for Spyder. A first step may be a creating a simple control logic using a space temperature sensor and set point as inputs to a PID. The PID output may be connected to a damper. The physical input may be a space temp input point 11 connected to an input of a PID function block 13 with a link 21. A constant value may be a set point input point connected to another input of the PID function block 13 with a link 22. The output of function block 13 may be connected to an input of a damper output point 14 with a link 23. Output point 14 may be for a physical output.

Figure 2:
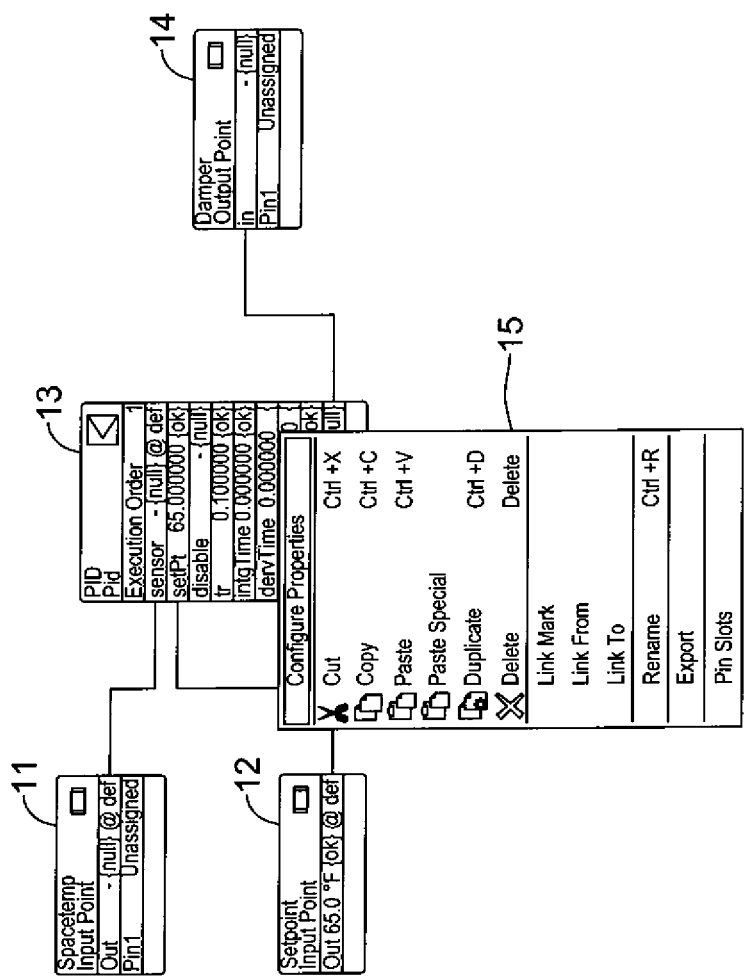
FIG. 2 is a diagram of a context menu on a point for configuring the point type.

FIG. 2 illustrates a configuring a point type. A context menu 15 on the point allows its configuration to be changed. A configuring properties menu may be obtained by clicking on the point whose point type is to be changed.

Figure 3:
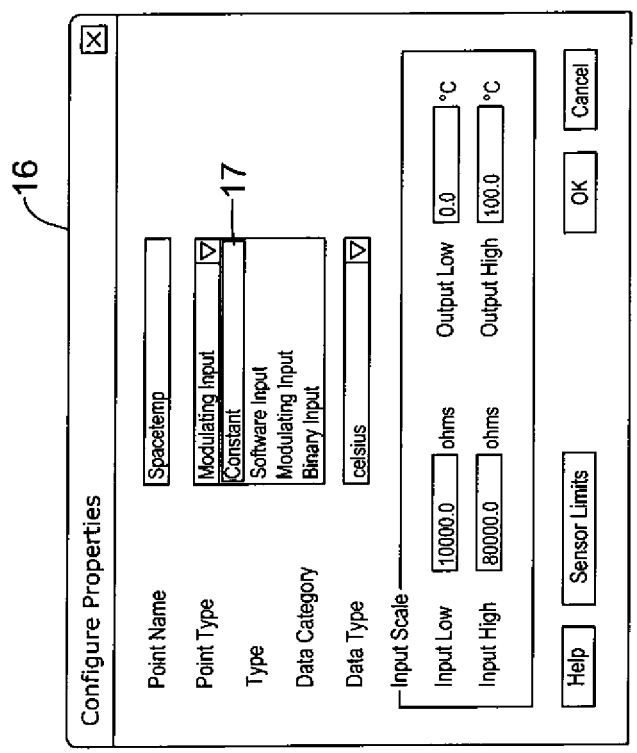
FIG. 3 is a diagram illustrating a changing of an input point from a modulating one to a constant value.

A first part of a second step, which is converting a space temperature input 11 to a constant value, is illustrated by a dialog box 16 shown in FIG. 3. A drop-down menu 17 of "Configure Properties" dialog box 16 shows a point type for "Space Temp" 11. As indicated in menu 17, the physical input (modulating input) (AI) may be converted to a constant type, software input (AV) or a binary input (BI), by clicking on "constant" of menu 17 or other item (e.g., software input, modulating input, or binary input) as appropriate list in the dropdown menu 17. A diagram in FIG. 3 shows the changing or converting of space temp from a modulating input to a constant value.

Figure 4:
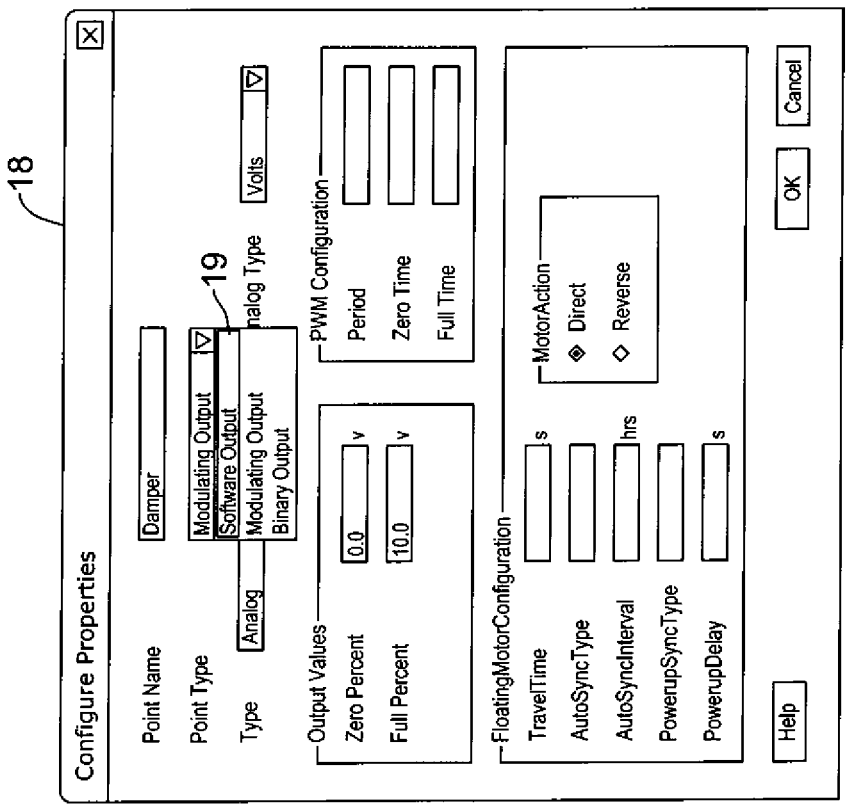
FIG. 4 is a diagram illustrating a changing of an output point from a modulating one to a software output.

A second part of the second step, as illustrated by use of a dialog box 18 of a diagram in FIG. 4, may be a converting or changing the damper output 14 as a modulating output to a software output or BACnet pseudo output (BV object). A drop-down menu 19 of Configure Properties dialog box 18 shows a point type for Damper 14. As indicated in menu 19, the physical output (modulating output) (AO) may be converted to a software output (AV) or a binary output (BO) by a selection or a click on the desired item in menu 19.

Figure 5:
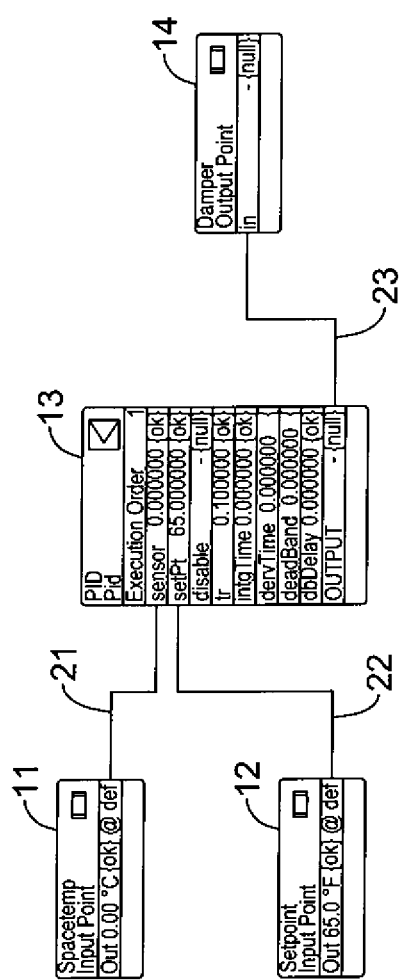
FIG. 5 is a diagram show the control logic staying intact subsequent to converting point types.

FIG. 5 illustrates that the control logic 10 may stay intact during conversion of the point types. Links 21, 22 and 23 among the components 11-14, respectively, may remain unbroken.

A Spyder tool may offer a graphical environment to program the Spyder controller. One may use the wiresheet view in the engineering mode to use physical points, software points, and function blocks to build an application in the control program. The physical points, software points, and function blocks may be accessed using a palette. One may drag these items on to the wiresheet and connect them, based on one's need, to develop application logic. The logic that one creates may then be stored in a Spyder library for reuse. Upon being satisfied with the logic one has created, one may download the same to the controller. The logic thus created may be tested for correctness using the simulation and online debugging modes.

One may note that changing NCI (network configuration input) values, configuration of a schedule block, or daylight savings option, puts the application in a quick download pending state. As long as the application has been downloaded at least once to the controller, these changes just trigger a quick download to the controller.

One may use the control program option to program the Spyder tool. To do this, one may expand Lon™ (Lon) Spyder or BACnet Spyder in the Nav palette and double-click control program to display the wiresheet view; display the palette (from the menu bar, select Window>Sidebars>Palette to display the palette).

The palette may appear on the left pane with the following items. Lon Spyder is a device that one may drag on to the Lon Network in the Nav palette to create a new device. Note that one cannot drop this on to the wiresheet of any macro or control program or application. BACnet Spyder is a device that one may drag on to the BACnet Network in the Nav palette to create a new device. It may be noted that one cannot drop this on to the wiresheet of any macro or control program or application. Physical points may be modulating and binary inputs or outputs. Software points may be used to create a network input, network setpoints, or a network output.

Additional items may include analog function blocks, logic function blocks, math function blocks, control function blocks, data-function function blocks, zone arbitration function blocks, and built-in function blocks.

It may be noted that a macro may be a group of functional blocks grouped together that define a specific functionality. Commonly used program elements may be defined as macros so that they could be reused across applications. An application may include macros and logic that one can define and use in applications. Standard applications may be provided for the Spyder used to build application logic One may drag any of these noted items on to the wiresheet of a control program in its engineering mode and make the connections between physical points, software points, and function blocks to create a control program or an application.

A wiresheet view may be used to drag the Physical points and function blocks to build the application logic. One may save a logic created to be used later and also shared with other users. One may build several applications and store them in a Spyder library along with standard applications.

After one has created the application logic and tested the logic using the simulation feature, the application logic may be downloaded to the controller. To download the application logic, one may: 1) on the Nav palette, right-click the device and select Actions>Download (the download dialog box may appear); and 2) select True under full download for a full download or false for a quick download. One may note that a quick download just downloads the modified items from a previous download where as with a full download the entire configuration may be downloaded to the controller replacing the existing configuration. However, if changes have been made to the SBus (Sylk or sensor bus) wall module by an operator/tenant locally from the display on the wall module, and a full download is performed, the Spyder tool may download the entire configuration to the controller except the SBus wall module configuration. This may be done to avoid losing any changes made locally on the SBus wall module during a download operation. Then at 3), one may click OK. The application logic may be downloaded to the controller based on one's selection.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for changing types of points of a software control program configured to be executed on a processor of a heating, ventilation, and air conditioning (HVAC) controller to control an HVAC system, comprising:
   providing a control logic of a software control program configured to be executed on a processor of an HVAC controller programmed to execute the software control program to control an HVAC system, the control logic comprising:
      a function block;
      an input point connected to the function block; and
      an output point connected to the function block; and
   changing one of the input point and the output point from one type of HVAC system related point to another type of HVAC system related point by changing a type of point from a physical point to a software point; and
   wherein:
      a connection between the changed point and the function block of the control logic is not affected by the changing of the type of point of the one of the input point and the output point;
      the control logic is programmed with a computer programming tool which provides a graphical environment for building the control logic by selecting points and one or more function blocks and connecting them in a wiresheet;
      a point is an object which can be connected to a function block with a link;
      the point is a parent container point object having a child object;
      a type of a point is a child object;
      to change the type of point is to change the child object;
      a link between a point and a function block is a link between a parent container and the function block; and
      a change of a type of a point does not affect the link between the point and the function block.

2. The method of claim 1, wherein:
   a first link is used to provide a connection between the input point and the function block; and
   a second link is used to provide a connection between an input point and the function block; and
   the links remain connected upon changing a type of point.

3. The method of claim 1, further comprising changing a type of input point from a modulating output, a binary output or a software output to a binary output, a software output or a modulating output.

4. The method of claim 1, further comprising changing a type of output point from a modulating output, a binary output or a software output to a binary output, a software output or a modulating output.

5. The method of claim 1, wherein the input point is a parameter sensor input point.

6. The method of claim 1, wherein the output point is an actuator output point.

7. The method of claim 1, further comprising connecting a set point input point connected to the function block.

8. The method of claim 7, wherein:
   the input point is a space temperature input point;
   the output point is a damper actuator output point; and
   the function block is a PID function block.

9. The method of claim 1, wherein:
   a configure properties menu is associated with the input point; and
   the type of input point is changed by selecting a different type of point listed in the configure properties menu.

10. The method of claim 1, wherein:
    a configure properties menu is associated with the output point; and
    the type of output point is changed by selecting a different type of point listed in the configure properties menu.

11. A system of control logic for changing types of points of a software computer program configured to be executed on a processor of a heating, ventilation, and air conditioning (HVAC) controller to control an HVAC system, comprising:
    a processor of a heating, ventilation, and air conditioning (HVAC) controller configured to control an HVAC system; and
    a control logic of a software computer program configured to be executed on the processor of an HVAC controller, wherein the processor is programmed to execute the software computer program to control the HVAC system, the control logic comprising:
       a function block;
       an input point connected to the function block, wherein the input point has an adjustable type; and
       an output point connected to the function block, wherein the output point has an adjustable type; and
    wherein:
       a point can be changed from one type of HVAC system related point to another type of HVAC system related point by changing the type of point from a physical point to a software point;
       a connection between the point and the function block of the control logic is not affected by changing the type of the point from a physical point to a software point;
       the control logic is programmed with a computer programming tool which provides a graphical environment for building the control logic by selecting points and one or more function blocks and connecting them in a wiresheet;
       a point is an object which can be connected to a function block with a link;
       the point is a parent container point object having a child object;
       a type of a point is a child object;
       to change the type of point is to change the child object;
       a link between a point and a function block is a link between a parent container and the function block; and
       thus a change of a type of a point does not affect the link between the point and the function block.

12. The system of claim 11, wherein:
    a first link is used to provide a connection between the input point and the function block; and
    a second link is used to provide a connection between an input point and the function block; and
    the links remain connected upon changing a type of point.

13. The system of claim 11, wherein:
    a configure properties menu is associated with the input point; and the type of input point is changed by selecting a different type of point listed in the configure properties menu.

14. An approach for switching between point types of a software control program configured to be executed on a processor of a heating, ventilation, and air conditioning (HVAC) controller to control an HVAC system, comprising:
changing a point type of a point having a link to a function block of a control logic of a software control program configured to be executed on a processor of an HVAC controller programmed to execute the software control program to control an HVAC system, from one type of HVAC system related point to another type of HVAC system related point by changing a type of point from a physical point to a software point; and wherein:
the link between the point and the function block of the control logic of the software control program remains unchanged from when the point is the physical point to when the point is the software point;
the control logic is programmed with a computer programming tool which provides a graphical environment for building the control logic by selecting points and one or more function blocks and connecting them in a wiresheet;
the link is used to provide a connection between the point and the function block;
the point is a parent container point object having a child object;
a type of a point is a child object;
to change the type of point is to change the child object;
the link between a point and a function block is a link between a parent container and the function block; and
therefore a change of a type of a point does not affect the link between the point and the function block.

15. The approach of claim 14, wherein
the link remains connected upon changing a type of point.

16. A method for changing types of points of a software control program configured to be executed on a processor of a heating, ventilation, and air conditioning (HVAC) controller to control an HVAC system, comprising:
providing a control logic of a software control program configured to be executed on a processor of an HVAC controller programmed to execute the software control program to control an HVAC system, the control logic comprising:
a function block;
an input point connected to the function block; and
an output point connected to the function block;
deploying the software control program with the provided control logic to a job; and
changing one or more of the input point and the output point of the control logic of the deployed software control program from one type of HVAC system related point to another type of HVAC system related point; and wherein:
a connection between the changed point and the function block of the control logic is not affected by the changing of the type of point of one or more of the input point and the output point;
the control logic is programmed with a computer programming tool which provides a graphical environment for building the control logic by selecting points and one or more function blocks and connecting them in a wiresheet;
a point is an object which can be connected to a function block with a link;
the point is a parent container point object having a child object;
a type of a point is a child object;
to change the type of point is to change the child object;
a link between a point and a function block is a link between a parent container and the function block; and
thus a change of a type of a point does not affect the link between the point and the function block.

* * * * *